INVENTOR.
Tomas HORNAK
BY
his Attorney

Oct. 14, 1969　　　　T. HORNAK　　　　3,473,123
ASYNCHRONOUS SAMPLING OSCILLOSCOPE HAVING
AN ARBITRARY DISPLAY RATE
Filed Jan. 10, 1966　　　　　　　　　　6 Sheets-Sheet 2

INVENTOR.
Tomas HORNAK
BY Arthur O. Klein
his Attorney

INVENTOR.
Tomas HORNAK
BY Arthur O. Klein
his Attorney

Oct. 14, 1969

T. HORNAK 3,473,123

ASYNCHRONOUS SAMPLING OSCILLOSCOPE HAVING AN ARBITRARY DISPLAY RATE

Filed Jan. 10, 1966

INVENTOR.
Tomas HORNAK
BY Arthur O. Klein
his Attorney

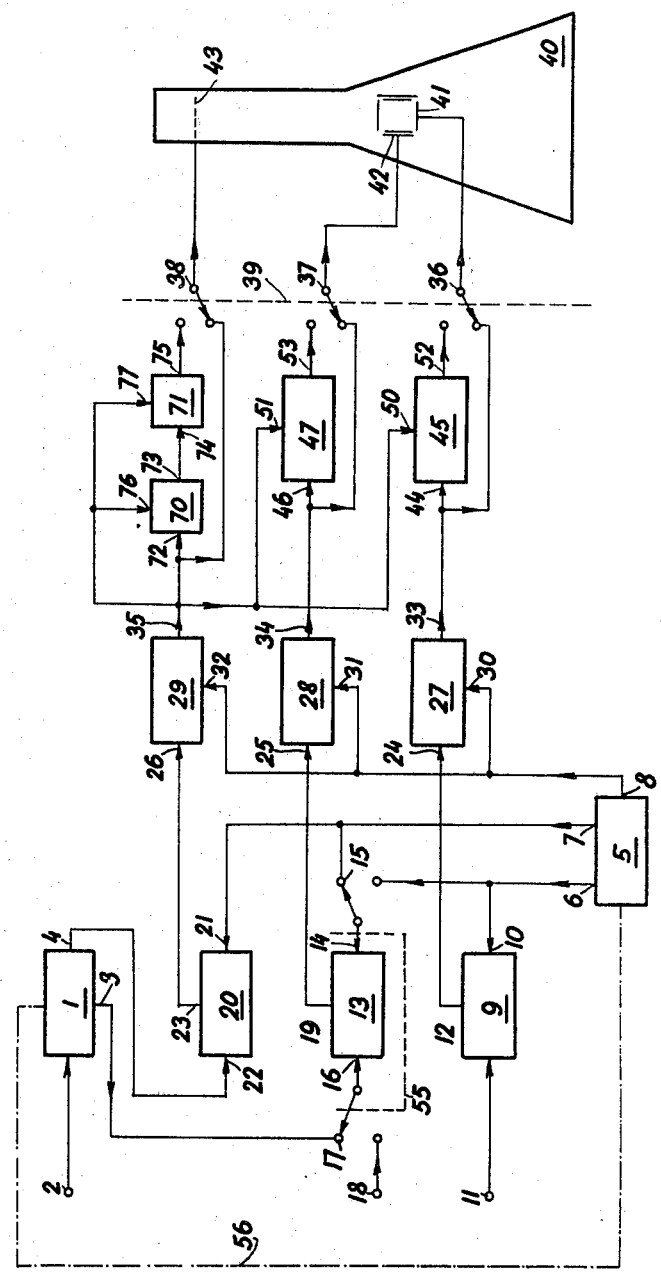

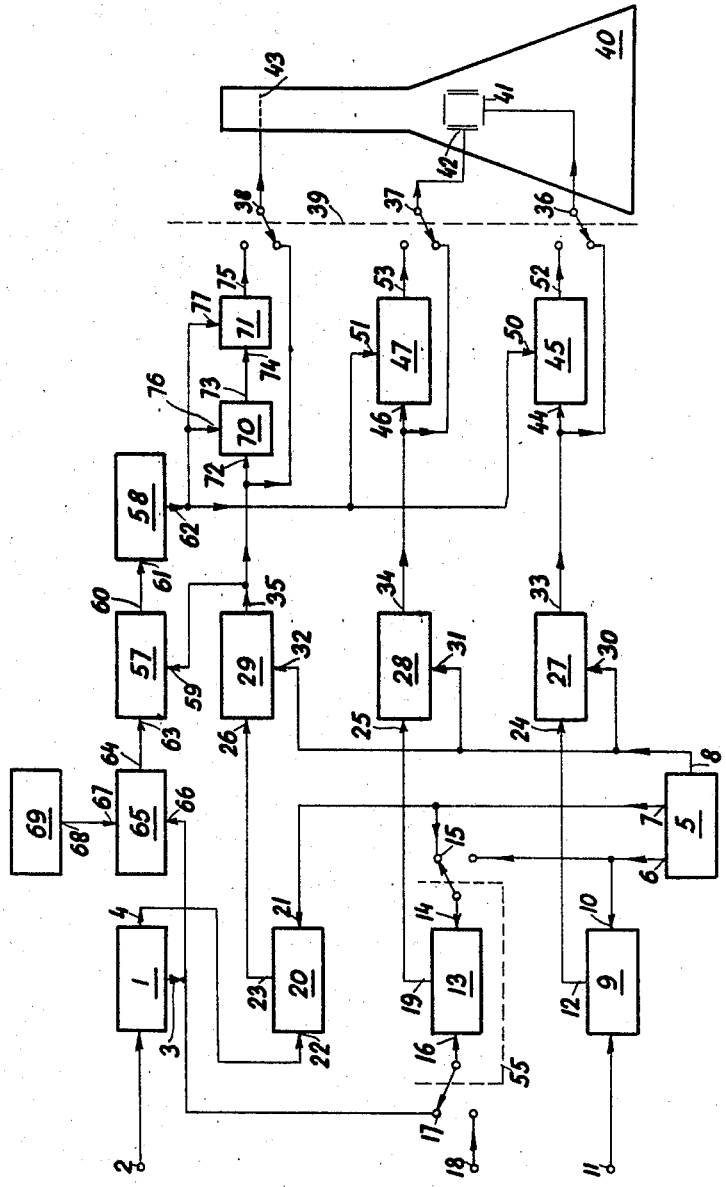

United States Patent Office 3,473,123
Patented Oct. 14, 1969

3,473,123
ASYNCHRONOUS SAMPLING OSCILLOSCOPE
HAVING AN ARBITRARY DISPLAY RATE
Tomas Hornak, Prague, Czechoslovakia, assignor to Vyzkumny ustav Matematickych stroju, Prague, Czechoslovakia, a firm
Filed Jan. 10, 1966, Ser. No. 519,979
Claims priority, application Czechoslovakia, Dec. 31, 1965, 2,877/65, 2,878/65, 2,879/65
Int. Cl. G01r 13/20
U.S. Cl. 324—121       4 Claims

ABSTRACT OF THE DISCLOSURE

A universal random sampling oscilloscope samples an incoming repetitive wave form at a rate independent of the wave form repetition rate and applies the samples to the oscilloscope screen at the sampling rate. The samples derived from the regions of the wave form outside of the portion to be analyzed are rendered invisible on the screen by Z-axis blanking. Facilities are provided for making the average brightness of the trace independent of the width of the wave form portion to be analyzed.

---

This invention relates to cathode ray oscilloscopes and, more particularly, to sampling oscilloscopes for analyzing recurrent AC waveforms. Accordingly, it is an object of the invention to provide new and improved apparatus of this character.

A convenient way of analyzing recurrent AC waveforms is with the use of an oscilloscopic technique known as equivalent time sampling. In this technique a succession of sampling pulses is time-synchronized with, and progressively delayed with respect to, the start of successively occurring cycles of the AC waveform. The resulting rate of generation of the signal samples is further synchronized with the movement of the luminous spot on the oscilloscope screen. The spot is moved point by point across the screen at discrete intervals so that the developing trace defines an accurate replica of the AC signal waveform (or a selected portion thereof) over an independently selected recurrent interval that is long in relation to the repetition period of the AC signal waveform.

This technique has been frequently employed in synchronous sampling oscilloscopes, in which the repetition rate of an extremely high frequency AC signal applied to the vertical input terminal is effectively slowed down to a rate that can be handled by the limited-bandwidth amplifiers associated with the oscilloscopic deflection plates. This permits the trace to be developed with unimpaired deflection sensitivity and, therefore, to serve as a high-fidelity representation of the signal waveform. With the use of jitter suppression techniques such as those described, e.g., in U.S. Patent 2,954,501 (1960), the display of such an oscilloscope can be made sensibly independent of irregularities in the repetition rate of the sampling pulses, and relatively insensitive (except to the degree of vulnerability possessed by ordinary non-sampling oscilloscopes) to irregularities in the repetition rate of the AC signal. Also, by a suitable modification of the jitter-suppression technique, the above-mentioned patent teaches a technique by which a synchronous sampling oscilloscope may be adapted to display a Lissajous pattern of simultaneous samples taken from a pair of high-frequency AC signals respectively applied to its vertical and horizontal plates.

Despite the fact that the equivalent time sampling technique theoretically permits an arbitrary portion of a broadband, complex AC signal to be displayed with high fidelity, the use of the above-described synchronous sampling oscilloscopes for universal applications (i.e., those designed to accommodate both low and high frequency signals) has not been particularly advantageous vis-a-vis the use of ordinary non-sampling oscilloscopes. In the first place, the response of the synchronous sampling oscilloscope to AC signals in the lower frequency range is much slower than that of the ordinary oscilloscope. For example, the former requires many discrete points (typically 1000), one from each successive sampled cycle of the AC waveform, to form a display trace of adequate resolution. Thus, the progressive generation of a low-frequency waveform trace by the uniformly-spaced steps of the luminous spot may take many seconds. This drawback is not present in ordinary non-sampling oscilloscopes. Moreover, the synchronous sampling oscilloscope, like the orinary oscilloscope, requires a time base that is time-synchronized with the AC signal, so that the non-zero inertia of the time base generator must be compensated either by a cumbersome bandwidth-limiting input signal delay line or by a special circuit for generating a time base trigger that precedes the leading edge of the AC signal. In other respects (e.g., uniformity of trace brightness, adaptability for jitter suppression, and Lissajous pattern representation capability), the non-sampling oscilloscope and the synchronous sampling oscilloscope have similar characteristics. On balance, therefore, the former is presently preferred for universal applications.

In an article, Frye, E. G., and Nahman, N. S., Random Sampling Oscillography, IEEE Transactions on Instrumentation and Measurement, March 1964, pp. 8–13, there is described an asynchronous sampling scheme in which no time-synchronization between the AC signal and the sampling pulses is necessary. In such an arrangement, therefore, the requirement of the above-mentioned delay line and/or leading trigger is eliminated. In this arrangement, the sampled trace is developed randomly on the screen, so that even with low frequency signals at least the broad outlines of the trace are developed reasonably rapidly on the screen. The random sampling arrangement is also reasonably free from jitter, since the development of the trace does not primarily depend upon the cycle-to-cycle characteristics of the signal or of the sampling pulses but on the relative phase of this sampling pulse within each sampled cycle of the AC waveform.

Another object of the invention is to provide a new and improved universal oscilloscope utilizing asynchronous sampling techniques.

A further object of the invention is to provide new and improved asynchronous sampling apparatus for improving the low frequency performance of a sampling oscilloscope.

The asynchronous sampling technique described in the above-mentioned article has several disadvantages that prevent its utilization with maximum efficiency in a universal sampling oscilloscope. For example, the average brightness of the sampled trace on the screen decreases in proportion to a decrease in the relative width of the sampled portion of the waveform with respect to the recurrence period of the signal. Moreover, the maximum duration of the portion to be sampled cannot be independently chosen but instead bears a fixed relation to the frequency of the sampling pulses. Also, the arrangement shown is not adaptable for sampling and comparing selected portions of two recurrent AC signals with the use of Lissajous patterns.

Another object of the invention, therefore, is to provide an asynchronous oscilloscopic sampling arrangement for produced a sampled waveform trace whose average brightness is independent of the relative duration of the portion of the AC signal to be sampled.

A further object of the invention is to provide an asynchronous sampling arrangement for displaying sampled traces representing an arbitrarily chosen percentage of the period of a recurrent AC signal.

All of the above objects are accomplished with the use of oscilloscopes employing the asynchronous sampling arrangements in accordance with the invention. In a preferred embodiment, means are provided for generating a recurrent sawtooth waveform at the rate of recurrence of the AC signal. The amplitude of the waveform increases linearly over a first selectable portion of its period. The first portion is selected to coincide with the time width of the AC signal portion to be sampled. The generating means are adapted to also provide a brightness control pulse that frames the linearly increasing portion of the first waveform. First, second and third gating circuits are further provided for individually sampling the AC signal, the sawtooth waveform, and the brightness control pulse. Means are provided for enabling all the gating circuits at a second rate, the second and third gating circuits being enabled with a selectable predetermined phase delay with respect to the enabling of the first gating circuit to compensate for the non-zero inertia in the generation of the sawtooth waveform.

The output samples of the several gating circuits are lengthened to an interval almost equal to the period of the second rate. The lengthened signal, sawtooth waveform, and brightness pulse samples are respectively coupled to the vertical and horizontal deflection plates of the oscilloscope and to its brightness modulation electrode, which is adapted to render the trace visible whenever a brightness pulse sample is applied thereto. The resulting trace on the screen is a representation of the portion of the waveform corresponding to the duration of the linearly increasing portion of the sawtooth waveform and thus of the desired percentage of the AC waveform.

In one principal aspect of the invention, the trace brightness is made essentially independent of the relative time duration of the selected signal portion to be sampled by individually interposing a pair of storage circuits in the path of the lengthened signal and sawtooth samples, respectively. The first and second storage circuits are conditioned for the reception of succeeding ones of the associated lengthened samples upon the application of an exciting pulse from a network controlled by the successive lengthened brightness samples. The output of the respective storage circuits are applied to the vertical and horizontal plates, and the control pulses are applied to the brightness modulation electrode through a polarity inverter.

In another principal aspect of the invention, the relative phase or other characteristic of selected portions of a pair of recurrent AC signals may be randomly sampled and displayed on the screen as a Lissajour pattern. For this purpose, the sawtooth waveform is decoupled from the second gating circuit and a second AC signal is substituted therefor. The selectable phase delay between the enabling times of the first and second gating circuits is made equal to zero. If the entire periods of the two AC waveforms are to be compared, the brightness control pulse is removed from the third gating circuit, and the latter is adjusted to gate enabling pulse samples to the brightness control electrode in synchronism with the application of all the signal samples to the vertical and horizontal plates, respectively.

The nature of the present invention and its various aspects, advantages and features will appear more fully from the following detailed description taken in connection with the appended drawing, in which:

FIGS. 5 and 6 are block diagrams of asynchronous sampling oscilloscopes similar to those of FIGS. 1 and 3, respectively and including arrangements for permitting the superposition of brightness marks on the sampled trace.

Figure 1:
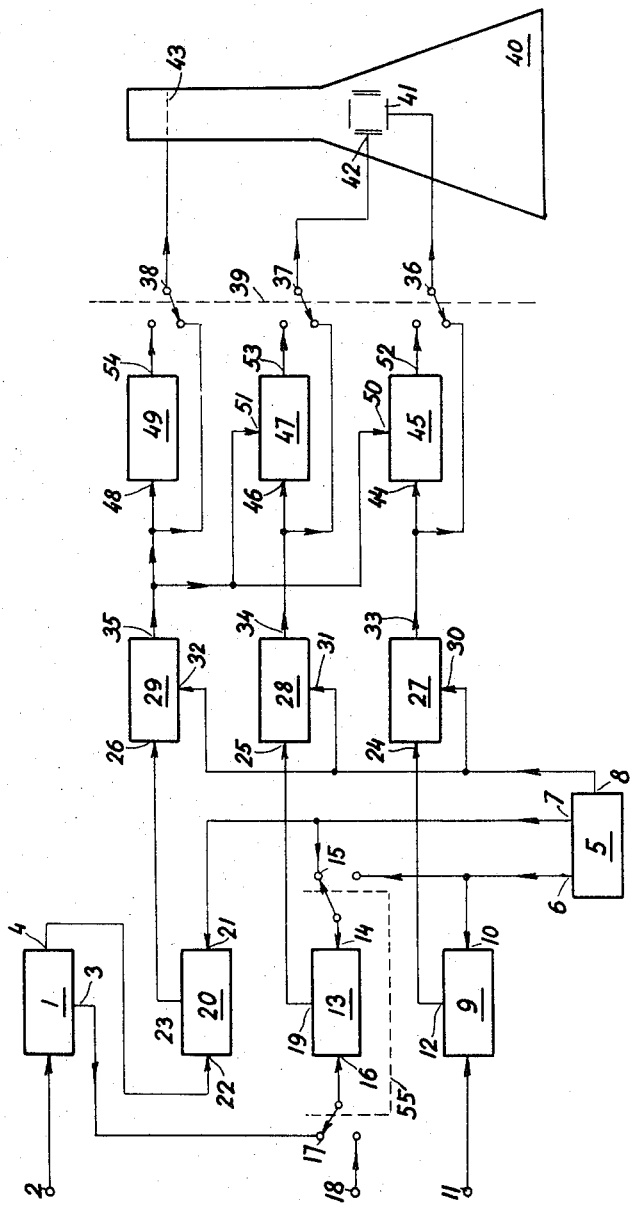
FIG. 1 is a block diagram of one embodiment of an asynchronous sampling oscilloscope constructed in accordance with the invention.

Referring in more detail to the drawing, a first illustrative embodiment of the invention is depicted in FIG. 1. A recurrent AC signal is applied to a signal input terminal 11. It is assumed for purposes of this description that the incoming AC signal consists of a pulse whose duration is much narrower than the repetition period of the signal and which is to be sampled to the exclusion of the remainder of the signal waveform. It is further assumed that the repetition period of the pulse may be subject to jitter.

A trigger pulse (not illustrated), which recurs at the rate of the AC waveform applied to the input terminal 11 and may be directly derived therefrom, is applied to a terminal 2. The trigger actuates an adjustable time base circuit 1, which may be a sawtooth generator. The sawtooth waveform of the time base circuit 1 is designed so that its amplitude increases linearly over a selectable interval that is adjusted, in accordance with the invention, to be equal to the duration of the narrow pulse portion of the recurrent AC waveform at input 11. It is assumed that the linear portion of the sawtooth waveform commences at a small but finite interval after the application of the trigger pulse to the circuit 1. The sawtooth waveform is taken from an output 3 of the circuit 1.

The circuit 1 is also adapted to generate a brightness control signal in the form of a positive pulse having a duration coextensive with that of the linear portion of the sawtooth voltage at output 3. The brightness control pulses are taken from an output 4 of the circuit 1.

The AC waveform at terminal 11 is applied to a first gating circuit 9 that is enabled by each of a succession of sampling pulses (not illustrated) from a free running pulse generator 5, whose frequency may be harmonically unrelated to the repetition rate of the AC signal. The sampling pulses are applied to an auxiliary input 10 of the first gating circuit 9 from a first output 6 of the pulse generator 5. The signal samples from the first gating circuit 9 are taken from an output 12 and are conditioned (by means described below) for application to a pair of vertical plates 41 of a cathode ray tube 40.

A second gating circuit 13 and a third gating circuit 20 are provided for respectively sampling the waveforms at the outputs 3 and 4 of the time base circuit 1 with sampling pulses from the generator 5. A pair of inputs 14 and 16 of the second gating circuit 13 are individually coupled to the contact arms of a double pole, double throw switch 15, 17.

When the contact arms of the switch 15, 17 are in the upper position as shown in FIG. 1, the sawtooth waveform of the time base circuit 1 is applied to the input 16 of the second gating circuit 13, and the sampling pulses are applied to the input 16 from a second output 7 of the generator 5. The sampling pulses at the outputs 6 and 7 of the generator 5 are assumed to occur at identical rates but are displaced in time phase so that the waveform at output 7 lags the waveform at output 6 by a time interval equal to the above-mentioned finite delay in the start of the linear portion of the sawtooth voltage. In this way the sampling of the leading edge of the AC waveform at terminal 11 coincides with the start of the linear portion of the sawtooth waveform.

The brightness control waveform from the time base circuit 1 is applied to an input 22 of the third gating circuit 20. Sampling pulses are applied to an auxiliary input 21 from the output 7 of the generator 5. The sawtooth and brightness control samples at the outputs of the second and third gating circuits 13 and 20 are also conditioned (by means described below) for application to the horizontal plates 42 and the brightness electrode 43 of the tube 40.

The outputs 12, 19 and 23 of the first, second and third gating circuits 9, 13 and 20 are respectively connected to a plurality of inputs 24, 25 and 26 of a corresponding plurality of memory circuits 27, 28 and 29. The memory circuits 27, 28 and 29 may each consist of an arrangement (not shown) that includes an input amplifier and a first capacitor charged to the voltage at the output of the amplifier through a first diode. The charges on the first capacitors, and thus the amplified samples, are maintained after the termination of the corresponding samples from the associated gating circuits. The charges on the capacitors are maintained until the capacitors are discharged by the simultaneous application of suitable pulses to a plurality of auxiliary inputs 30, 31 and 32 through a plurality of second diodes (not shown) so that the sampled pulses applied to the inputs 24, 25 and 26 are lengthened by a selectable amount. The lengthened pulse samples in the memory circuits 27, 28 and 29 are individually applied from a plurality of outputs 33, 34 and 35 to the vertical and horizontal plates 41 and 42 and to the brightness electrode 43 of the tube 40 through the several contact arms 36, 37 and 38 of a triple pole, double throw switch 39 when the latter switch is in the bottom position shown in FIG. 1.

The discharge pulses for the first capacitors in the several memory circuits 27, 28 and 29 are supplied from an output 8 of the sampling pulse generator 5. The discharge pulse waveform is arranged to have a repetition rate identical to that of the sampling pulse waveforms at outputs 6 and 7, except that the waveform at output 8 leads the waveform at output 6 by an amount at least equal to the short discharge time of the first capacitors. Thus the amplified samples in the memory circuits 27, 28 and 29 are lengthened to a duration that is just short of the recurrence interval of the sampling pulses. After each first capacitor has been discharged by the associated pulse from the output 8, the memory circuits 27, 28 and 29 are clear. The AC signal, the sawtooth waveform and the brightness control waveform are then sampled in the associated gating circuits 9, 13 and 20 by the next occurring sampling pulse. These samples, in turn, are applied to the associated cleared memory circuits 27, 28 and 29, and the above-described steps are repeated.

With the arrangement thus far described, each lengthened signal sample that corresponds to an instantaneous point lying in the narrow pulse portion of the AC waveform will be accompanied by a lengthened sample from the linear portion of the sawtooth waveform and by a lengthened sample from the pulse portion of the brightness control waveform. The resulting vertical deflection of the luminous spot on the screen will be proportional to the instantaneous amplitude of the sampled point in the pulse portion of the AC signal. The corresponding horizontal deflection of the luminous spot will be proportional to the time phase position of the sampled point with respect to the start of the pulse portion of the signal since, as explained before, the start of the linear sweep and the start of the pulse portion of the AC signal are in time relation. The resultant position of the spot on the screen (hereafter sometimes called the "*x-y*" coordinates) will be visible since the simultaneously occurring brightness pulse sample will cause the brightness electrode 43 to effect the illumination of the screen at the locus of the *x-y* coordinates.

By contrast, each lengthened signal sample that corresponds to an instantaneous point lying outside the desired pulse portion will be accompanied by a lengthened sample from the flyback portion of the sawtooth waveform and by a lengthened sample from the relatively negative quiescent portion of the brightness control waveform. The resulting *x-y* coordinates on the screen will not be visible, since the brightness control electrode 43 will not illuminate the screen in the absence of a lengthened sample from the positive pulse portion of the brightness control waveform. Thus, the visible representation on the screen will be the trace envelope defined by only the signal samples occurring during the pulse portion of the AC signal.

It will be noted that by lengthening or shortening the duration of the linearly increasing portion of the sawtooth waveform, the portion of the sampled AC signal displayed on the screen will be correspondingly varied. Thus, the time width of the signal portion to be displayed is independent of the recurrence frequency of the signal.

The arrangement of FIG. 1 may be modified to display sample traces representing comparative characteristics of selected portions of a pair of recurrent AC signals. In this modification, the double-pole, double-throw switch 15, 17 is placed in its lower position (i.e., the position opposite to that shown in FIG. 1) to decouple the sawtooth waveform at the output 3 of the time base circuit 1 from the input 16 of the second gating circuit 13 and to decouple the sampling waveform at output 7 of the generator 5 from the input 14. In this position, an input 18, to which a second recurrent AC signal is externally coupled, is applied to the input 16, and the sampling waveform at output 6 of the generator 5 is applied to input 14. With this arrangement, the second AC signal is sampled in the second gating circuit 20 in synchronism with the sampling, at input 11, of the AC signal (hereafter called the first AC signal). The samples representing the first and second AC signals are lengthened in the memory circuits 27 and 28, respectively, and are then applied to the vertical and horizontal plates 41 and 42 to form a Lissajous pattern of the simultaneous signal samples.

Since only selected portions of the signals are to be compared by the use of the simultaneous samples, it is necessary to frame this desired portion with a brightness pulse from the output 4 even though the saw tooth waveform from the output 3 has been decoupled from the arrangement shown. In order to accomplish this, the double pole, double throw switch 15, 17 is initially switched back to its upper position as shown in FIG. 1, thereby decoupling the second AC signal at terminal 18 from the second gating circuit 13.

The trace on the screen will again be the sampled waveform of the portion of the first AC signal corresponding to the selected interval of the linear portion of the sawtooth waveform, which has been re-coupled to the second gating circuit 13. The duration of the linear portion of the sawtooth waveform is then adjusted, if necessary, so that the duration of the trace on the screen is coextensive with the interval over which the first and second AC signals are to be compared. The brightness control pulse is automatically adjusted by this procedure to frame the desired interval. After this is accomplished, the switch 15, 17 is placed back in the lower position as shown in FIG. 1. The resulting Lissajous pattern on the screen will be illuminated only when the simultaneous samples of the first and second AC signals correspond to instantaneous points lying within the selected region of the signals, since the screen will not be illuminated during the occurrences of the samples from other portions of the signals.

In the event that the first and second signals are to be compared over their entire cycles, the trigger pulse may be removed from the time base circuit 1 so that the latter will be inoperative. In such a case the brightness control waveform will be absent from the input 22 of the third gating circuit 20. In order to prevent the Lissajous trace from being invisible as a result of this, the effective DC voltage level at the input 22 is raised, as by the addition of a superimposed positive DC voltage (not illustrated) at the input 22, so that the samples at the output 23 will be of sufficient amplitude, when ultimately applied to the brightness electrode 43, to illuminate the *x–y* coordinates defined by the simultaneously occurring signal samples. Since the samples from the gating circuit 20 will now be of invariant amplitude over the entire cycle of the signals to be compared, every signal sample will be present in the Lissajous pattern on the screen.

The arrangements described above in connection with FIG. 1 have been assumed to operate with the triple-pole, double-throw switch 39 in its lower position, i.e., the position shown in FIG. 1. Under such circumstances, the rate of application of the lengthened coordinate-determining pulse samples to the associated deflection plates is identically equal to the sampling rate. If the sampling rate is high, and if, as has been assumed, the AC waveform is a recurrent narrow pulse having a low duty cycle (i.e., a low ratio of pulse duration to pulse repetition period), it is statistically likely that a very small percentage (i.e., that corresponding to the duty cycle) of the signal samples applied to the vertical deflection plates will represent points within the pulse duration of the AC waveform. Thus, because of the selective operation of the brightness pulse samples as described before, only this small percentage of the signal samples will be visible on the screen. The average brightness of the resulting trace on the screen under the conditions just outlined is approximately the quotient of the total number of signal samples illuminated per cycle of the AC signal to the total number of signal samples occurring during the same period. As a result, the overall brightness of the trace diminishes as the relative time width of the poriton of the signal to be sampled decreases with respect to the signal repetition period.

This drawback can be effectively avoided in accordance with the invention by placing the triple-pole, double-throw switch 39 in its upper position (i.e., in the position opposite to that shown in FIG. 1).

With this arrangement, the lengthened samples from the memory circuits 27 and 28 are routed to the respective inputs 44 and 46 of a fourth memory circuit 45 and a fifth memory circuit 47. The circuits 45 and 47 are constructed to receive the lengthened samples from the memory circuits 27 and 28 only during the application of suitable exciting pulses to a pair of auxiliary inputs 50 and 51 respectively, of the circuits 45 and 47. Each of the circiuts 45 and 47 may comprise a second capacitor for storing the amplitudes of the lengthened samples applied thereto from the associated one of the circuits 27 and 28 until the occurrence of the next succeeding pulse at the associated auxiliary input. In the arrangement shown, in FIG. 1, the auxiliary inputs 50 and 51 of the circuits 45 and 47 are simultaneously coupled to the lengthened brightness pulse samples from the third memory circuit 20 so that the last-mentioned samples serve as the exciting pulses for the memory circuits 45 and 47.

In operation, each occurrence of a lengthened brightness pulse sample at the output of the memory circuit 29 will cause the simultaneously occurring lengthened signal and sawtooth waveform samples to be gated to the memory circiuts 45 and 47, respectively. (It will be understood that the last-mentioned samples represent the x-y coordinates of a point within the pulse portion of the AC waveform, since they are accompanied by a brightness pulse sample). These lengthened coordinate samples are stored in the respective circuits 45 and 47, and are thereby continually applied to the vertical and horizontal plates, respectively, until the occurrence of the next brightness pulse sample from the memory circuit 29. Hence, intervening occurrences of coordinate samples, which represent points lying outside the desired portion of the AC signal, will be blocked from the memory circuits 45 and 47 and thus from the associated deflection plates. Irrespective of the total number of coordinate samples extracted from one cycle of the AC signal, only that number extracted from the desired pulse portion reach the screen.

If the lengthened brightness control samples are applied directly to the electrode 43 from the third memory circuit 29, the trace of the desired coordinate samples will be invisible except during the initial inter-spot switching interval. This is because the long duration on the screen of each desired set of coordinates coincides generally with the relatively negative quiescent poriton of the brightness control waveform. To avoid this, the output of the third memory circuit 29 is applied to the electrode 43 through a polarity inverter 49. A brightened trace of the desired portion of the AC waveform will result, and the unwanted switching transients will be invisible.

In the above-described arrangement for maintaining the trace brightness independent of the relative portion of the AC waveform to be displayed, it is important to assure that the selected signal portion not be sampled more than once during each cycle of the signal. If this is not done (i.e., if the selected signal portion is sufficiently long with respect to the period of the sampling pulses that several points in the selected portion are successively sampled during a single cycle of the AC waveform) the presence of the polarity inverter 49 will cause all but the last of the samples from the desired portion to be invisible on the screen. This last sample will be illuminated continuously until the occurrence of the first sample in the desired portion of the next succeeding AC cycle, except for the initial switching transient, therefore only the last interval of the selected portion having a duration equal to the sampling pulse period is illuminated on the screen.

Figure 2:
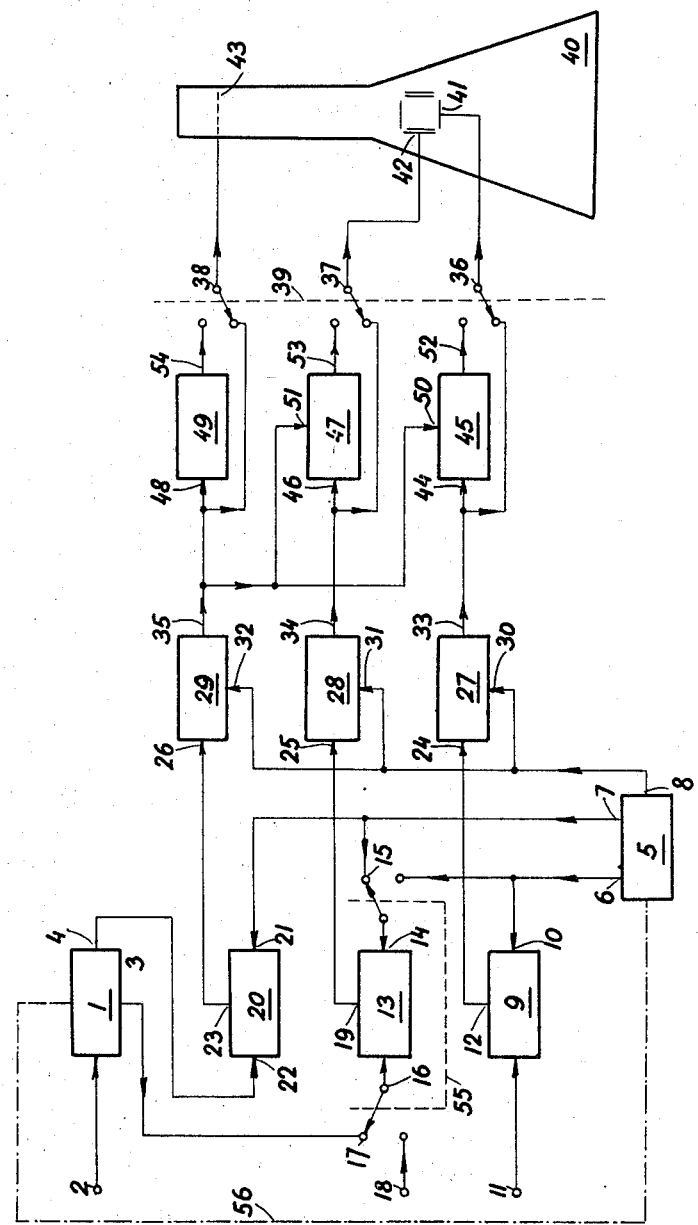
FIGS. 2 and 3 are block diagrams of asynchronous sampling oscilloscopes similar to that of FIG. 1 and including first and second arrangements, respectively, for rendering the average sampled trace brightness independent of the relative time duration of the waveform portion to be sampled.

FIG. 2 shows one arrangement for assuring that only one sampling pulse will occur during the arbitrarily selected portion of the AC waveform. FIG. 2 is basically the same as FIG. 1 except that a linkage 56 is provided for adjusting the repetition frequency of the sample pulse generator 5 in proportion to the selected linear sweep interval of the sawtooth waveform from the time base circuit 1, and thus to the selected portion of the AC signal. Preferably, the factor of proportionality is chosen such that the sampling pulse period is slightly longer than the duration of the selected linear sweep interval.

Illustratively, if the linear sweep interval is controlled by a potentiometer (not shown) in the circuit 1, the generator 5 may be embodied as a circuit, of a type well known in the art, that has a voltage-controlled frequency output characteristic. In such a case the linkage 56 will be purely electrical. Other arrangements, in which the linkage 56 and the associated controls on the circuit 1 and generator 5 are mechanical or electromechanical, will readily occur to those skilled in the art. In any event, the linkage 56 is assumed to be inoperative when the triple-pole, double-throw switch 39 is in its lower position as shown in FIG. 2.

Figure 3:
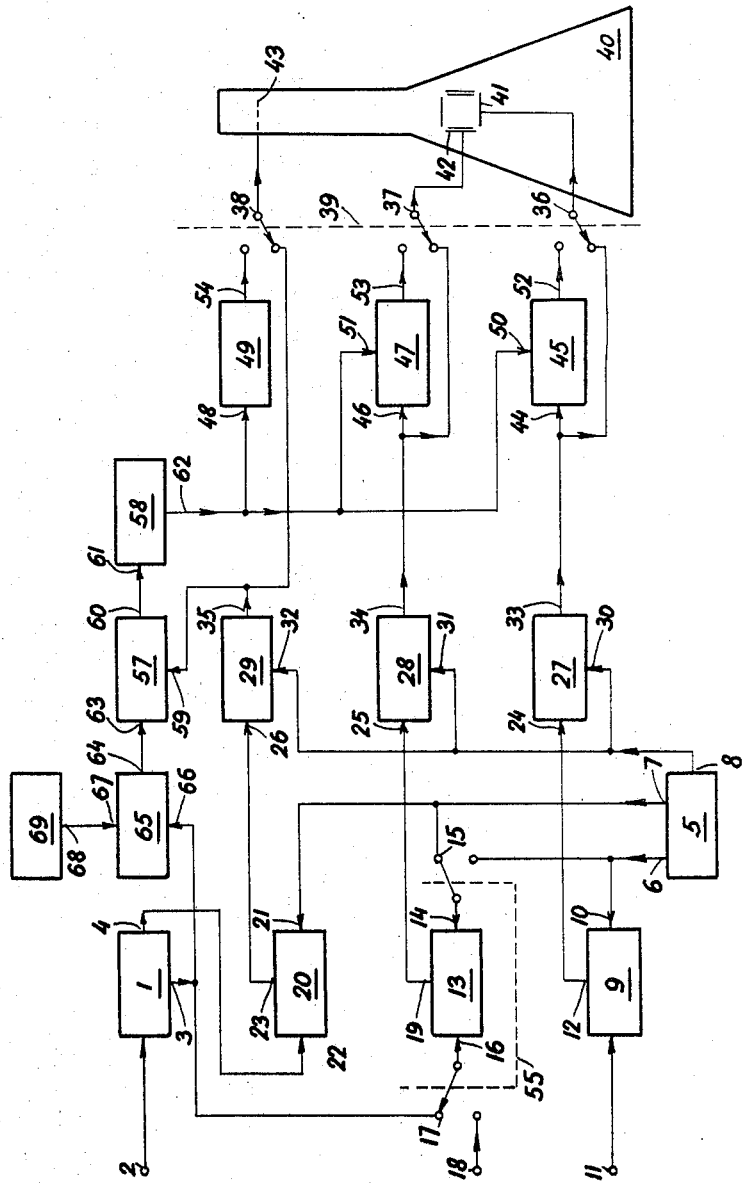
Figure 4A:
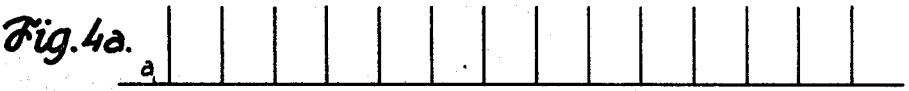
FIG. 4 is a pictorial diagram showing amplitude and time relationships among waveforms existing at several points in the arrangement of FIG. 3.
Figure 4B:
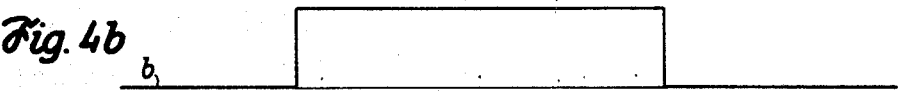
Figure 4C:
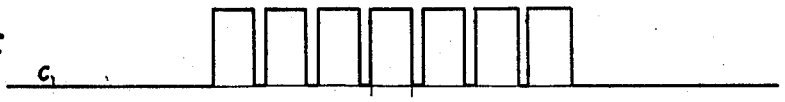
Figure 4D:
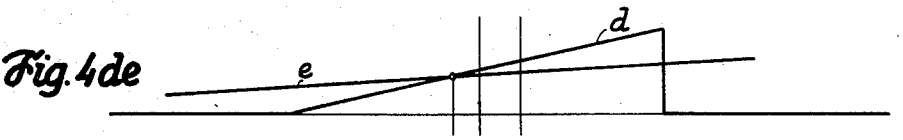
Figure 4F:
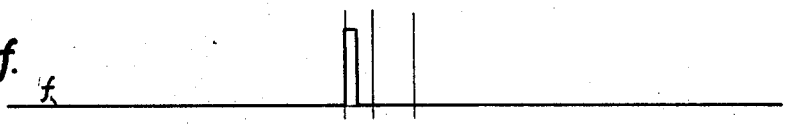
Figure 4G:
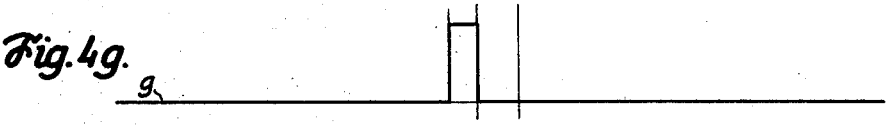
Figure 4H:
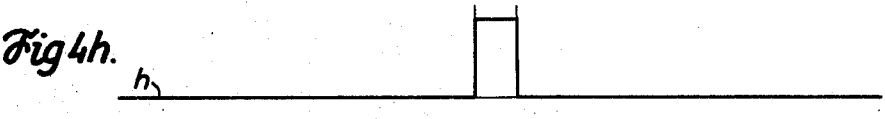

FIG. 3 shows an alternative arrangement for assuring that only one sampling pulse will be used during an arbitrarily selected portion of the AC signal. This arrangement, which is effective when the switch 39 is in its upper position, operates at all times with a fixed sampling pulse rate and thereby simplifies the construction of the generator 5, the gating circuits 9, 13 and 20, and the memory circuits 27, 28 and 29. This embodiment includes, in addition to the circuitry of FIG. 1, a control circuit interconnecting the output of the third memory circuit 29, the auxiliary inputs 50 and 51 of the fourth and fifth memory circuits 45 and 47, and the input 48 of the polarity inverter 49. The function of the control circuit is to randomly select, during each cycle of the AC signal, one and only one of the assumed plurality of pulse samples extracted during the preselected portion of the AC waveform for application to the vertical plates.

The operation of this control circuit, which includes a cooperative arrangement of an auxiliary sweep voltage generator 69, an amplitude-sensitive coincidence circuit 65, a bistable multivibrator 57 and a monostable multivibrator 58, may be explained in connection with the comparative waveform diagram of FIG. 4. Curve a illustrates the sampling pulse waveform applied to the third gating circuit 20. Curve b illustrates the brightness control waveform applied to the input 22 of the third gating circuit 20. The brightness pulse samples, after being lengthened in the third memory circuit 29, are in the form shown in curve c. Curve d illustrates the sawtooth waveform from the time base circuit 1.

The sawtooth waveform (curve d) of the circuit 1 is coupled from the output 3 to a first input 66 of the coincidence circuit 65. The auxiliary sawtooth waveform (curve e) of the generator 69 is coupled to a second input 67 of the coincidence circuit 65. As shown in curve e, the auxiliary sawtooth waveform includes a linearly increasing portion that intersects the sawtooth waveform of curve d but has a much longer period. The coincidence circuit 65 is arranged to generate a pulse (curve f) upon each amplitude coincidence between curves d and e. As is clearly shown, this amplitude coincidence can take place only during the linearly increasing portion of curve d, and thus during the preselected portion of the AC waveform. Moreover, since the circuit 1 and the generator 69 are unsynchronized, the coincidence can statistically occur anytime during the preselected interval of the AC signal.

The pulse (curve f) generated by the coincidence circuit 65 is coupled from an output 64 thereof to an input 63 of the bistable multivibrator 57. The lengthened brightness pulse samples (curve c) are applied to an auxiliary input 59 of the multivibrator 57. The output of the multivibrator 57 is a recurrent pulse (curve g) that is triggered on by the leading edge of each coincidence pulse (curve f) and triggered off by the leading edge of the next succeeding lengthened brightness pulse sample (curve c). The pulse generated by the multivibrator 57 is applied from an output 60 thereof to an input 61 of the monostable multivibrator 58. The latter is arranged to be triggered by the trailing edge of its input pulse (curve g) to generate a fixed duration pulse (curve h). The duration of the latter pulse is chosen, by appropriate adjustment of the multivibrator 58, to be equal to the duration of the lengthened brightness pulse samples (curve c). The output pulse of the multivibrator is simultaneously coupled through an output 62 thereof to the auxiliary inputs 50 and 51 of circuits 47 and 49 and to the input 48 of the polarity inverter 49.

It will be noted from the above description of FIG. 3 that the successive output pulses (curve h), which effectively serve to modulate the electrode 43 and to control the application of the x-y coordinate pulse samples to the plates 41 and 42 in the same manner as do the brightness control pulse samples in FIGS. 1 and 2, arrive at random times during the preselected portion of each succesive sampled cycle of the AC signal. Thus, it is statistically likely that over many signal periods all points in the preselected portion will be equally displayed on the screen, thereby maximizing the fidelity of the trace.

FIGS. 5 and 6 respectively illustrate modifications of the arrangements of FIGS. 1, 2 and 3 for the purpose of operating with a pair of relatively delayed sawtooth waveforms from the time base circuit 1. By analogy to non-sampling oscilloscopes utilizing such dual time bases, the delay of the second time base is represented on the screen by an increased brightness in a corresponding portion of the trace. This is accomplished in the arrangements of FIGS. 5 and 6 with the use of means (not shown) for increasing the amplitude of a portion of the brightness control pulse at the output 4 of the time base circuit 1. When this is done, certain of the brightness pulse samples occuring during the preselected portion of the AC signal will have a larger amplitude than the others.

FIGS. 5 and 6 respectively differ from the corresponding FIGURES 1, 2 and 3 in that the polarity inverter 49 is replaced by the tandem arrangement of a sixth memory circuit 70 and a fourth gating circuit 71. The switch 39 is assumed to be in its upper position (i.e., the position opposite to that shown in FIGS. 5 and 6).

The sixth memory circuit 70, which is assumed to be constructed in a similar manner as the fourth and fifth memory circuits 45 and 47, is provided with a principal input 72 and an auxiliary input 76. By contrast, the construction of the fourth gating circuit 71 is assumed to be such as to inhibit the passage of a signal applied to an input 74 thereof when an excitation pulse is applied to an auxiliary input 77. The auxiliary input 77 is interconnected with the auxiliary input 76 of the circuit 70 and the auxiliary inputs 50 and 51 of the circuits 45 and 47. Excitation pulses are simultaneously applied to the auxiliary inputs 50, 71, 76 and 77 by the third memory circuit 29 (in the case of FIG. 5) or by the monostable multivibrator 58 (in the case of FIG. 6).

During the occurrences of the successive excitation pulses, which may at any given time have either one or the other of the two amplitudes corresponding to the displaced zero phase points of the assumed dual time base waveforms, the pulses are stored in the sixth memory circuit 70 and are blocked from the brightness electrode 43 by the then-inhibited fourth gating circuit 71. Since, as explained above, each occurrence of an excitation pulse also switches the spot position on the screen, the switching transient will be invisible. However, between occurrences of the successive excitation pulses, the gating circuit 71 will be conductive and will permit the modulation of the brightnes electrode by the dual-amplitude excitation pulses. Thus, the relative delay of the dual time base waveforms is indicated by the additional brightening of certain portions of the sampled trace even while the average brightness of the trace is improved and made more uniform with the use of the arrangements described in connection with FIGS. 1–4.

In the foregoing, the invention has been described in connection with preferred arrangements thereof. However, many other variations and modifications (e.g., the simultaneous representation of sampled traces of a plurality of waveforms on a direct or time-shared basis) will now become obvious to those skilled in the art. Accordingly, it is desired that the breadth of the claims not be limited to the specific disclosure herein contained.

What is claimed is:

1. In a cathode ray oscilloscope for analyzing a selected portion of a first wave form that cyclically recurs at a first rate:

first and second cooperative pairs of deflection plates; an intensity modulation electrode;
first means for generating a first recurrent saw-tooth wave form at the first rate, the linear sweep portion of the first saw-tooth wave form having a duration equal to the selected portion of the first test wave form;
second means synchronized with the first generating means for generating a recurrent brightness pulse wave form at the first rate, the brightness pulse duration being coincident with the duration of the linear sweep portion of the first saw-tooth wave form;
first means for sampling the first test wave form at a second rate independent of the first rate;
second and third means operative in timed relation with the first sampling means for simultaneously sampling the first saw-tooth wave form and the brightness pulse wave form, respectively, at the second rate; and
conditioning means triggered by each of a first succession of the brightness pulse samples for continually coupling the corresponding ones of the first test wave form and saw-tooth wave form samples to the first and second deflection plates, respectively, until the occurrence of the next brightness pulse sample in the first succession, whereby only those samples corresponding to points on the selected portion of the first test wave form are applied to the deflection plates.

2. An oscilloscope as defined in claim 1, further comprising means for comparing the selected portion of the first test wave form with the corresponding portion of a second test wave form recurring at the first rate, the comparing means comprising, in combination, fourth means operative in synchronism with the second sampling means for sampling the second wave form at the second rate, and switching means for decoupling the applying means from the second deflection plates and for coupling the second test wave form samples to the second deflection plates.

3. An oscilloscope as defined in claim 1, in which the period of the sampling pulses is shorter than the width of the selected portion of the first test wave form, and in which the applying means further comprises means for selecting, for application to the respective ones of the deflection plates, a random one of the plurality of first test wave form samples, and the corresponding one of the first saw-tooth wave form samples, occurring during each recurrence period of the first test wave form.

4. An oscilloscope as defined in claim 3, in which the selecting means comprises, in combination, means for generating an auxiliary saw-tooth wave form at a rate substantially lower than the first rate;

means for generating a first pulse upon each amplitude coincidence of the auxiliary saw-tooth wave form and the linear sweep portion of the first saw-tooth form; bistable pulse forming means for defining a second pulse triggered on by each first pulse and triggered off by the next succeeding brightness pulse sample; monostable pulse forming means triggered upon the termination of each second pulse for generating a third pulse having a duration substantially equal to the brightness pulse sample; and means responsive to each occurrence of a third pulse for triggering the conditioning means.

References Cited

UNITED STATES PATENTS

| | | | |
|---|---|---|---|
| 2,939,038 | 5/1960 | Farber | 324—121 XR |
| 2,954,501 | 9/1960 | Pfeiffer | 324—77 XR |
| 3,010,071 | 11/1961 | Carlson | 328—186 |
| 3,011,129 | 11/1961 | Magleby et al. | 328—151 |
| 3,069,559 | 12/1962 | Chaplin et al. | 328—186 XR |
| 3,229,212 | 1/1966 | Rogers | 328—186 XR |
| 3,244,989 | 4/1966 | Carlson | 328—186 XR |
| 3,248,655 | 4/1966 | Kobbe et al. | 328—186 XR |

OTHER REFERENCES

McQueen, The Monitoring of High-Speed Waveforms; Electronic Engineering; October 1952; pages 436–441.

Trye et al, Random Sampling Oscillography; IEEE Transactions on Instrumentation and Measurement; March 1964; pages 8–13.

Sugarman, Sampling Oscilloscope for Statistically Varying Pulses; The Review of Scientific Instruments; November 1957; pages 933–938.

RUDOLPH V. ROLINEC, Primary Examiner

E. F. KARLSEN, Assistant Examiner

U.S. Cl. X.R.

315—22